United States Patent [19]

Boone

[11] Patent Number: 4,974,224
[45] Date of Patent: Nov. 27, 1990

[54] DISTRIBUTED SPLIT FLOW ROUTING MECHANISM FOR MULTI-NODE PACKET SWITCHING COMMUNICATION NETWORK

[75] Inventor: Stephen W. Boone, Beverly, Mass.

[73] Assignee: Harris Corporation, Melbourne, Fla.

[21] Appl. No.: 432,944

[22] Filed: Nov. 7, 1989

[51] Int. Cl.$^5$ .............................................. H04J 3/14
[52] U.S. Cl. ................................. 370/94.100; 370/16
[58] Field of Search ..................... 370/94.1, 94.3, 60,
370/104.1, 105, 93, 16, 54; 340/825.03, 826,
827; 379/219, 220, 221, 271, 272, 273

[56] References Cited

U.S. PATENT DOCUMENTS

| | | | |
|---|---|---|---|
| 4,320,500 | 3/1982 | Barberies et al. | 370/94.1 |
| 4,607,257 | 8/1986 | Noguchi | 370/104.1 |
| 4,644,532 | 2/1987 | George et al. | 370/94.3 |
| 4,679,189 | 7/1987 | Olson et al. | 370/94.1 |
| 4,736,363 | 4/1988 | Aubin et al. | 370/94.1 |
| 4,825,206 | 4/1989 | Brice, Jr. et al. | 370/94.1 |

OTHER PUBLICATIONS

Adrian Segall, "The Modeling of Adaptive Routing in Data Communications Networks", IEEE Transactions on Communications, Jan., 1977, vol. COM. 25 No. 1, pp. 85–95.

Primary Examiner—Douglas W. Olms
Assistant Examiner—Alpus H. Hsu
Attorney, Agent, or Firm—Evenson, Wands, Edwards, Lenahan & McKeown

[57] ABSTRACT

Routing variables for near optimally controlling the distributed flow of information signals from a node s over a multinode communication network to a destination node d are generated in accordance with a prescribed heuristic among network path delays. A prescribed routing variable value (e.g. zero) is assigned to each route to a node n, representing that that node is not to be used to route information signals from node s to node d, for any node of the network that either is not directly connected to node s, has not established a connection path to a destination node d, or is using node s as part of its communication path to destination node d. The path delays from node s to neighboring nodes n are measured and a measurment of the path delay from node s to destination node d is obtained. In addition periodically updated measurements of the path delays from neighboring nodes n to destination node d are received. For each neighboring node that may be used to route traffic, its associated routing variable is generated in accordance with the heuristic among the path delays. The path delay from node s to node d is then updated in accordance with a weighted sum of the routing variables and transmitted to neighboring nodes.

46 Claims, 3 Drawing Sheets

DISTRIBUTED SPLIT FLOW ROUTING MECHANISM FOR MULTI-NODE PACKET SWITCHING COMMUNICATION NETWORK

FIELD OF THE INVENTION

The present invention relates in general to communication systems and is particularly directed to a scheme for controlling the distribution of transmission routes for digital data traffic among member nodes of a multi-node, packet-switched communications network.

BACKGROUND OF THE INVENTION

Because of its computational simplicity, small channel capacity usage, reduced memory demand and rapid response to topological changes, some form of single-shortest-path (e.g. Bellman-Ford, ARPANET) selection scheme is typically employed for routing digital data traffic among member stations (nodes) of a multinode packet-switched communications network to destination. A major shortcoming of a single-shortest-path approach, however, is its failure to achieve optimal delay or throughput performance (minimum average delay and maximum throughput) during steady-state operation. This inadequacy results from the fact that, in a general multi-node network, optimal routing requires a splitting of the data flow (i.e. different packets from a given data source may travel along respectively different routes to a given destination).

In an effort to satisfy this requirement and take advantage of the substantial capacity of the network that goes unused in a single-shortest-path approach, there has been proposed an optimal steady state performance mechanism (in terms of minimum average delay and maximum possible throughput), known as the Gallager algorithm (described in an article entitled "A Minimum Delay Routing Algorithm Using Distributed Computation" by R. G. Gallager, IEEE Transactions on Communications, Vol. COM-25, Jan. 1977, pp 73-85), in which multiple paths through the network are employed, by subdividing flow into subportions that are routed over a number of different source-to-destination highways. In the Gallager scheme, routing variables are varied incrementally in accordance with control packets which propagate through the network, the control packets being based upon a link metric, which is the derivative of the delay with respect to traffic flow over a link.

This need to estimate the derivative of link delay is a principal obstacle to realizing a practical implementation of the Gallager approach. An estimate of the link delay could be based upon the output queue length (packets awaiting transmission at a node) and the known (or estimated) propagation delay. However, such an estimate would be noisy due to the varying queue length, and would therefor require a substantial amount of averaging (low-pass filtering) in order to obtain a reliable estimate. Estimating the derivative of the delay would require even more averaging, in order to filter the very noisy raw estimates. Indeed, because it is highly questionable whether sufficiently reliable estimates of the derivative of the link delay can obtained within a reasonable computation window, the practical application of the Gallager approach to an operational network is severely limited. Additional drawbacks of the Gallager mechanism include its computational complexity, its usage of a large portion of available channel capacity, the need to select a step size that is based upon network topology and traffic load, and its rather slow convergence to steady state.

SUMMARY OF THE INVENTION

In accordance with the present invention there is provided a new and improved distributed mechanism that is capable of achieving namely near-optimal split flow routing (maximal throughput, minimum delay) in the steady state (a major objective of the Gallager approach), while enjoying reduced computational complexity and hardware requirements, thereby making it practically realizable in an operational network. Pursuant to the present invention, routing variables for controlling the distribution of transmission paths for routing digital data packet switching traffic from any node, over multiple communication links through other nodes to a destination node, of a multinode communication network are generated, and iteratively updated, at each node in accordance with delay and use characteristics received from 'neighboring' nodes.

In accordance with a preferred embodiment of the invention, each node maintains a list of routing variables associated with every other node of the network. The value of each routing variable will depend upon the location of the node within the network topology, its ability to successfully route the packet to the destination node, its use by other nodes of the network and path delays within the network. For any node n of the network that either is not neighboring to node s from which a packet is routed, has not established a connection path to a destination node d, or is using node s as part of its communication path to destination node d, an associated routing variable $PHI(s,n,d)$ is set at a prescribed value (e.g. zero) representative of the fact that node n is not to be used to route information signals from node s to node d. For each remaining node n that is neighboring to node s, node s has received an estimated path delay from node n to destination node d. Also, an estimate of the path delay from node s to each of neighboring nodes n is derived. This estimate is based upon the propagation time between node s and neighboring node n and the average packet queueing delay at node s on the link to node n. For each of the remaining neighboring nodes n, a respective routing variable is generated in accordance with a prescribed heuristic based upon the measured path delays. The heuristic is such that a preliminary routing variable is generated from the measured path delays and then low-pass filtered to obtain an updated routing variable.

Specifically, the preliminary routing variable is derived in accordance with the ratio of the difference between a measurement of the path delay between node s and destination node d from the previous iteration and a measurement of the path delay between a neighboring node n and destination node d to the square of the sum of a measurement of the path delay between neighboring node n and destination node d and a measurement of the path delay between node s and neighboring node n. In the event that the measured path delay from a remaining neighboring node to the destination node exceeds a predetermined maximum, then the value of the preliminary routing variable is set at zero. The updated routing variable is then used to update the measurement of the path delay from node s to node d.

The path delay from node s to node d is updated in accordance with a summation of the path delays from node s to the neighboring nodes n and from the neighboring nodes to the destination node d, weighted by their respective updated routing variables. Each node s periodically transmits, to each of its neighboring nodes n and asynchronously with respect to the other nodes of the network, its most recently updated path delay from node s to each destination node d. It also transmits, as necessary, a digital code vector representative of which nodes of the network are participants in the routing of data packets from node s to destination node d. By setting the routing variable to zero in those instances where the vector indicates that another node is using node s to route packets to node d, it is ensured that no route from node s will loop back upon itself. These updates and vectors are used by the neighboring nodes to update their lists of routing variables.

DETAILED DESCRIPTION

Figure 1:
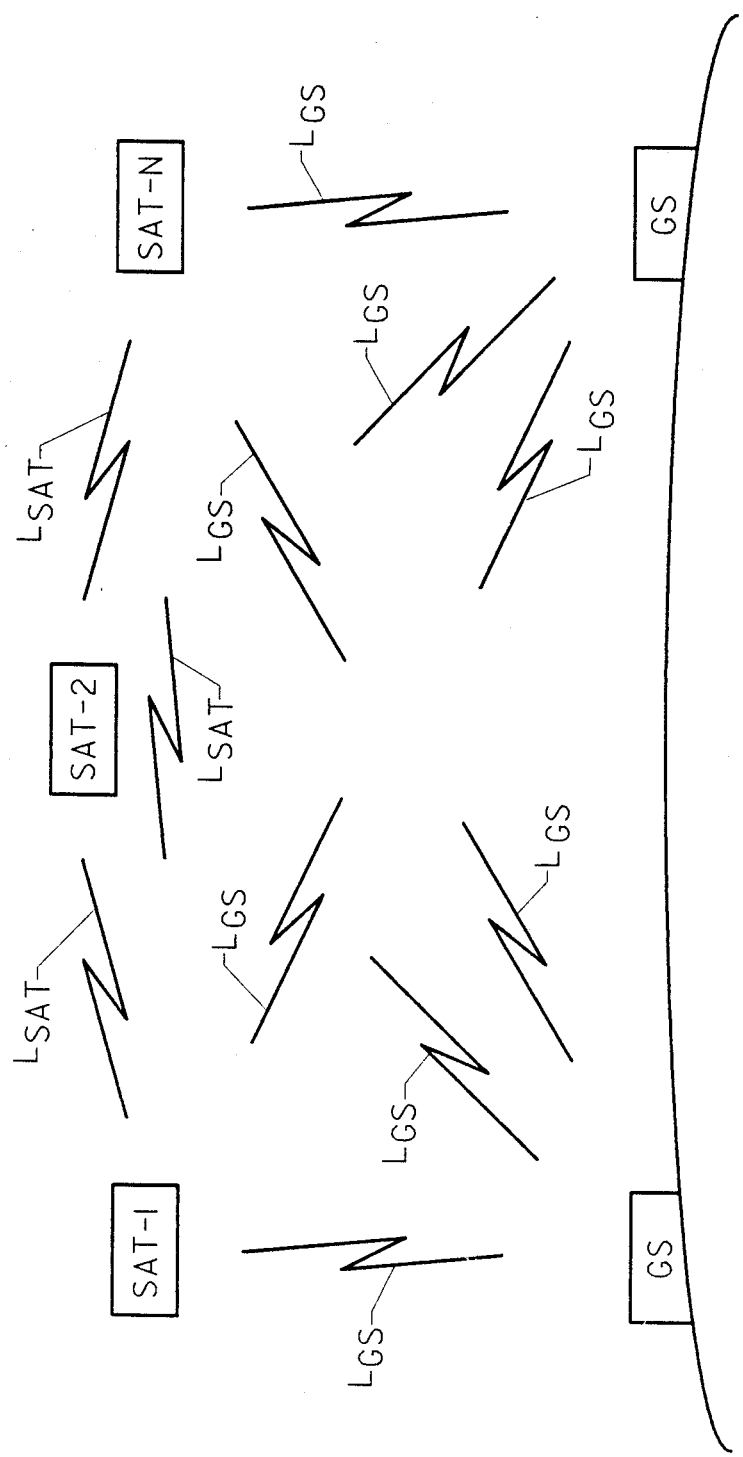
FIG. 1 diagrammatically illustrates a satellite communications system having a plurality of geographically distributed terrestrial stations that communicate with one another via a multiplicity of communication satellites over respective ground/satellite links.

Before describing in detail the particular improved distributed split flow routing scheme in accordance with the present invention, it should be observed that the present invention resides primarily in a novel packet switching control mechanism for controlling the routing of data among the member nodes of a communication network employing conventional communications circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

For purposes of providing an illustrative example, in the description to follow, the communications environment to which the present invention is applied is assumed to be a satellite communications system comprised of a plurality of communication satellites interlinked with one another and with a plurality of associated ground stations. However, it should be realized that the invention is not limited to use with this particular network or with only satellite communications systems, but is applicable to any multinode network in which communications between source and destination nodes may take place over multiple routes through the nodes of the network.

In the satellite communications system diagrammatically illustrated in FIG. 1, a plurality of geographically distributed terrestrial (ground) stations GS communicate with one another by means of a multiplicity of communication satellites SAT via respective ground-to-satellite (or satellite-to-ground) communication paths or links $L_{GS}$ and satellite-to-satellite communication links $L_{SAT}$. Namely, each of the ground stations GS and the satellites SAT is a respective network node, linked to one another via transmission paths $L_{GS}$ and $L_{SAT}$. Each node (whether it be a ground station GS or a communications satellite SAT) contains conventional transceiver, tracking and acquisition and signal processing equipment show in block diagram form in FIG. 2.

Figure 2:
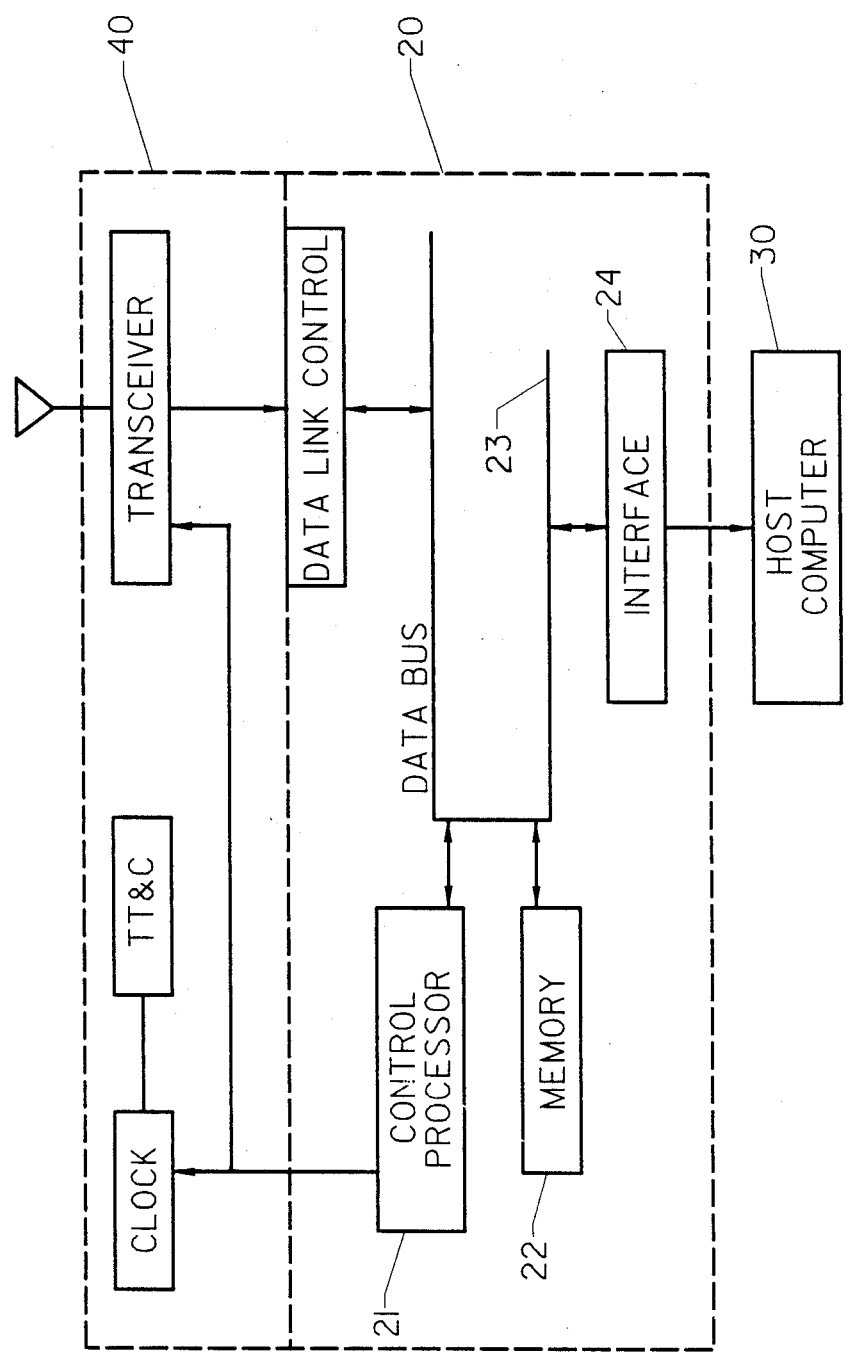
FIG. 2 diagrammatically illustrates the communication and signal processing components of a typical node, within which the distributed split flow routing mechanism of the present invention is implemented.

More particularly FIG. 2 illustrates a typical node block diagram, the central element of which is a packet switch 20 within which the routing mechanism is implemented. Coupled with a communications bus 23 of packet switch 20 (via interface unit 24) is a host computer system 30 which executes user processes and is the source and destination of all user data. The packet switch either delivers data packets to the host computer or it relays the packet t another node. Packet communication is typically effected by using a set of layered protocols similar to the seven-layer International Standards Organization (ISO) reference model of Open System Interconnection (OSI). Data link control is illustrated in FIG. 2 as a low-level function of layer 2 of the ISO reference model and serves to provide error-free transmission of packets. The data link control may be implemented using a standard synchronous data link communication protocol. For a more detailed explanation of this seven layer model, as well as a number of standard protocols that may be employed in accordance with the present invention attention may be directed to the textbook "Computer Networks" by Andrew S. Tanenbaum, Prentiss-Hall, Inc. 1981.

The basic control element within packet switch 20 is a general purpose computer referenced in FIG. 2 as control processor 21. Control processor 21 is primarily responsible for executing the network layer (layer 3) protocols. The network layer is the layer in which the packet routes are determined. The distributed split flow routing mechanism described below is executed by control processor 21.

Associated with control processor 21 is a random access memory 22 in which packet buffers, control software and routing variable tables reside. Memory 22 provides temporary storage for packets, while control processor 21 is deciding whether to deliver a packet to host computer 30 o to forward the packet to another node. The decision is based upon the address in the packet header. As will be explained in detail below, the data link to be used for forwarding a packet to another node is selected in accordance with the locally stored list of routing variables.

In addition to the control mechanism, FIG. 2 also shows conventional satellite communications equipment, which makes up the physical layer (layer 1) of the node, in the form of a transceiver unit 40 that contains transmitter, receiver, modulator and demodulator units and TT&C (tracking, telemetry and control) units interfaced with the packet switch through conventional data link control components. As the details of the configuration and operation of such equipment are unnecessary for gaining an understanding of the present invention they will not be described here. To the extent that source reference material for such components is desired, attention may be directed to standard communication texts such as "Digital Communications by Satellite" by J. J. Spilker, Prentiss-Hall, 1977. Carrier and bit synchronization may be effected using conventional mechanisms using phase-locked loops as described in an article entitled "Carrier and Bit Synchronization in Data Communication—A Tutorial Review" by L. E. Franks, IEEE Transactions on Communications, Vol. COM-28, August 1980, pp. 1107-1121. Precise timing of node operation may be implemented using techniques described in the articles "Network Timing/Synchronization for Defense Communications" by H. A. Stover, pp. 1234-1244 and in the paper entitled "Synchronization of a Digital Network" by J. Heymen et al pp. 1285-1290, IEEE Transactions on Communications, Vol. COM-28, August 1980.

As pointed out previously, while path delay and routing variable updates occur periodically at each node, they are conducted asynchronously among nodes of the network, so that they require no network timing, thereby considerably simplifying system configuration.

Figure 3:
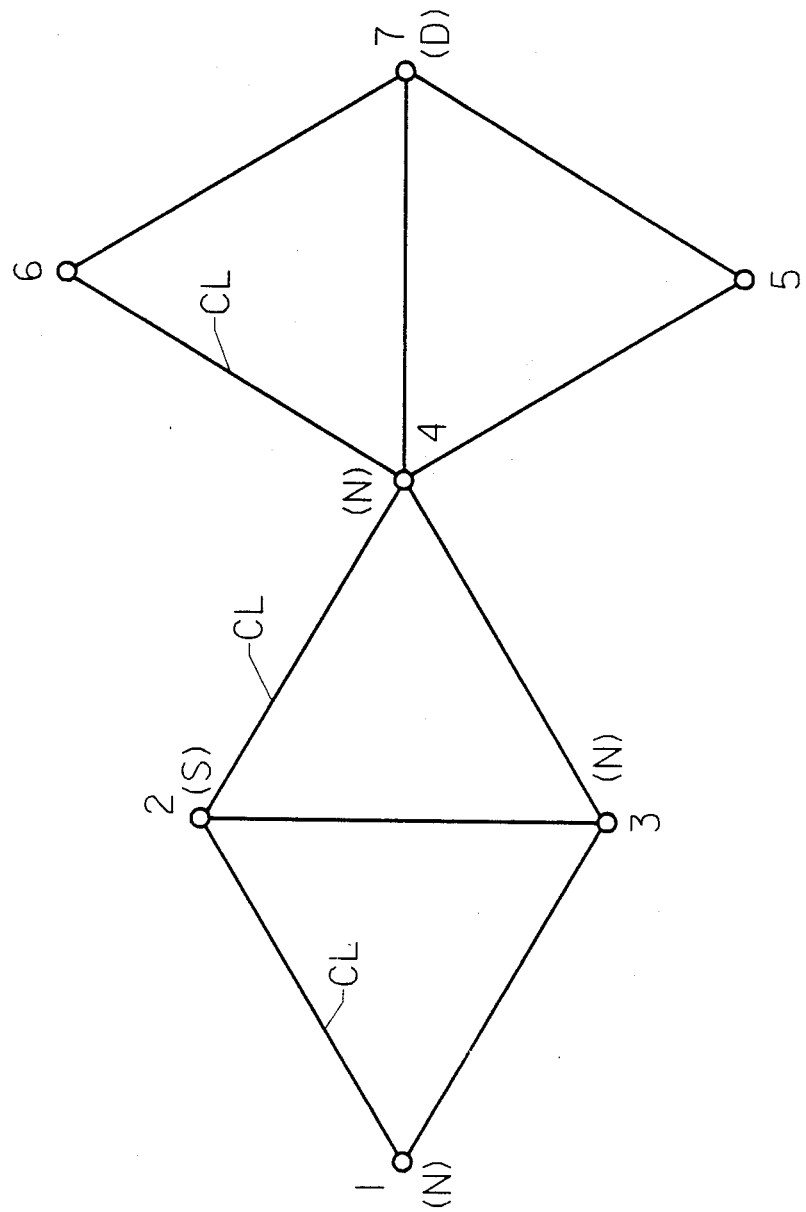
FIG. 3 diagrammatically depicts the topology of a seven node network for explaining the operation of the distributed split flow routing mechanism of the present invention.

In order to facilitate an appreciation of the distributed split flow network routing mechanism of the present invention, it is useful to examine the topology of a typical multinode communication network, such as a satellite communication system, referenced above, using an exemplary two-dimensional topology diagram, such as that depicted in FIG. 3. It should be noted, however, that the topology of the network to which the present invention may be applied is not limited to the example given or to only two dimensional topologies. In fact, in a practical environment, such as a spaceborne communications network, it can be expected that the topology will be three dimensional and will contain considerably more nodes than the network shown in FIG. 3. The two dimensional illustration is employed merely for reducing the complexity of the description.

FIG. 3 diagrammatically depicts the topology of a seven member station or node network comprising nodes 1, 2, 3, 4, 5, 6 and 7, one of which (e.g. node 2) is referenced as a source node s from which a message either originating at node s or being relayed from another node is to be routed to a destination node d (e.g. node 7) for whom the message from node 2 is intended. The nodes of the network topology of FIG. 3 are shown as being linked by a plurality of communication links CL over which messages are conveyed.

As noted above, the distributed split flow mechanism of the present invention periodically updates the routing variable list at each node in accordance with locally measured data and information received from its neighbors (i.e. nodes with which it shares a communication link CL). In the network topology of FIG. 3, node 2, which is sourcing a packet for transmission to destination node 7, is directly linked by a respective communication link CL to each of neighboring nodes 1, 3 and 4, but not to nodes 5, 6 and 7. Thus, node 2 conducts path delay measurements with respect to only links CL that connect node 2 to neighboring nodes 1, 3 and 4 and node 2 receives updates from and transmits updates to only these nodes. While the updates (periodic at a respective node, but asynchronous with respect to other nodes) will contain path delay information relative to destination node 7 in accordance with the distributed split flow mechanism of the present invention, no direct communication with or direct measurement on destination node 7 (which is not directly linked to node 2) is carried out.

During the interval between the transmission of update information, a respective node carries out two operations. It monitors the packet output queue for each of its associated links CL. Using a measure of the average packet output queue and knowing the propagation time over the link to the neighboring node, an estimate NAYDIS(s,n) of the delay to the neighboring node is derived. Using node 2 as a sourcing reference, node 2 derives an estimate NAYDIS(s,n) for each of its neighboring nodes 1, 3 and 4, i.e. a set of estimates NAYDIS(2,1), NAYDIS(2,3) and NAYDIS(2,4).

Secondly, each node receives update packets from its neighboring nodes. This received update information contains two parts. The first is the perceived path delay DELAY(n,d) from the neighboring node n to the destination node d, and may be set to predefined values indicating that the neighboring node has no established path to the destination node or, although connected, has a path delay in excess of some prescribed maximum. The perceived path delay DELAY(n,d) update is the result of the processing of the neighboring node's most recent routing update iteration. Thus, in the present example, source node 2 will receive delay updates DELAY(1,7), DELAY(3,7) AND DELAY(4,7) from neighboring nodes 1,3 and 4, respectively.

The second part of an update packet is a use vector USE(n,d) indicating which nodes are used on the current split flow route from the neighbor node n to the destination node d. The use vector measurement on destination node 7 (which is not directly linked to node 2) is carried out.

During the interval between the transmission of update information, a respective node carries out two operations. It monitors the packet output queue for each of its associated links CL. Using a measure of the average packet output queue and knowing the propagation time over the link to the neighboring node, an estimate NAYDIS(s,n) of the delay to the neighboring node is derived. Using node 2 as a sourcing reference, node 2 derives an estimate NAYDIS(s,n) for each of its neighboring nodes 1, 3 and 4, i.e. a set of estimates NAYDIS(2,1), NAYDIS(2,3) and NAYDIS(2,4).

Secondly, each node receives update packets from its neighboring nodes. This received update information contains two parts. The first is the perceived path delay DELAY(n,d) from the neighboring node n to the destination node d, and may be set to predefined values indicating that the neighboring node has no established path to the destination node or, although connected, has a path delay in excess of some prescribed maximum. The perceived path delay DELAY(n,d) update is the result of the processing of the neighboring node's most recent routing update iteration. Thus, in the present example, source node 2 will receive delay updates DELAY(1,7), DELAY(3,7) AND DELAY(4,7) from neighboring nodes 1,3 and 4, respectively.

The second part of an update packet is a use vector USE(n,d) indicating which nodes are used on the current split flow route from the neighbor node n to the destination node d. The use vector contains N bits, where N is the number of nodes in the network. A respective ith bit of the vector is set to a "1" if and only if node i is being used to route traffic from node n to node d. Otherwise the ith bit is set to a "0". The use vector is transmitted only when there has been a change in node usage, in order to reduce housekeeping overhead. From a practical standpoint, transmission of use vectors is necessary for only a finite number of updates after initial startup or after a network topology change.

Using the updates received from neighboring nodes and path delay measurements on its associated links, each node s generates and maintains a list of routing variables PHI(s,n,d) associated with each of its neighboring nodes n, for controlling the allocation of traffic routes through the network to a destination node d. The value of each routing variable will depend upon the use of that node by other nodes of the network, the location of the neighboring node within the network topology, the ability of that neighboring node to successfully route the packet to the destination node, and path delays within the network.

As noted above, for any node n of the network that either is not a directly connected neighbor to a node s from which traffic is to be routed, has not established a connection path to destination node d, or is using node s as part of its communication path to destination node d, the associated routing variable PHI(s,n,d) for that node n is set at a prescribed value (e.g. zero) representative of the fact that that node n is not to be used to route information signals from node s to node d. Thus, in the present example, none of nodes 5, 6 and 7 is a directly connected neighbor of node 2, so that the value of each of routing variables PHI(2,5,7), PHI(2,6,7), and PHI(2,7,7) in node 2's list of routing variables is set to zero. For purposes of the present description, it will also be assumed that the most recent used vector update from node 1 indicates that node 1 is using node 2 to route traffic to node 7. As a consequence, routing variable PHI(2,1,7) is set equal to zero. This latter action prevents node 2 from using node 1 to route its traffic to node 7 and thereby ensures no looping in the network, as node 2 is prohibited from routing traffic through neighboring node 1 which uses node 2 on its own split flow route to node 7. For each neighboring node (here, one of nodes 1,3 and 4) whose most recent update has indicated that that node has not established connection path to the destination node of interest (here, node 7) its associated routing variable PHI(s,n,d) is also set to zero, so that node s will not attempt to route traffic through a 'dead end' path.

For each of the remaining directly connected neighboring nodes (nodes 3 and 4 in the present example), the values of their respective routing variables PHI(2,3,7) and PHI(2,4,7) are generated in accordance with a prescribed heuristic among the measured path delays. The heuristic is such that a preliminary routing variable PHI(s,n,d)init is generated from the measured path delays and then low-pass filtered to obtain an updated routing variable.

Specifically, for each of nodes 3 and 4 an associated preliminary routing variable PHI(s,n,d)init is derived in accordance with the ratio of the difference between a measurement of the path delay between node 2 and destination node 7 from the previous iteration and measurement of the path delay between that neighboring node (3,4) and destination node 7 to the square of the sum of a measurement of the path delay between that neighboring node (3,4) and destination node 7 and a measurement of the path delay between node 2 and the neighboring node (3,4). Namely, $$PHI(s,n,d)init = \frac{(DELAY(s,d) - DELAY(n,d))}{(DELAY(n,d) + NAYDIS(s,n))^2} \quad (1)$$

In the above expression (1) for determining the initial value of the routing variable PHI(s,n,d), the denominator serves to decrease PHI(s,n,d) as the expected delay of packets through the neighboring node increases. The numerator serves to ensure that this initial value PHI(s,n,d)init is positive if and only if the expected delay to the destination node d from neighbor node n is less than the previously calculated expected delay from node s. The initial values PHI(s,n,d)init are normalized such that the sum over all n is equal to 1.0 for each destination node d.

In the event that the measured path delay DELAY(n,d) from one of the directly connected neighboring nodes (3,4) to destination node 7 exceeds a predetermined maximum, then the value of the preliminary routing variable is set at zero. Namely if the update packet from any neighboring node has indicated that, although having established a path to destination node 7, its associated path delay DELAY(n,7) is above some prescribed maximum, so that, in effect, that node is not capable of providing a useful routing path to node 7, its associated routing variable PHI(2,n,7)init is also set to zero, whereby node s will not attempt to route traffic through an 'almost dead end' path.

Each initial value of the routing variables PHI(s,n,d)init that has been calculated is then lowpass filtered with the values PHI(s,n,d)prev of the previous iteration to produce a current or updated routing variable value PHI(s,n,d)cur in accordance with the first-order lowpass filtering function:

$$PHI(s,n,d)cur = ALPHA*PHI(s,n,d)init + (1-ALPHA)*PHI(s,n,d)prev \quad (2)$$

As described briefly above, since the path delays DELAY(n,d) are based upon the current routing variables PHI(s,n,d)cur, as these routing variables change, the delays over the various links CL and paths to the destination change. These changed delays feed back into PHI(s,n,d) at the next iteration, as will be detailed below. Lowpass filtering function (2) serves to avoid oscillation and provide stability, by allowing only slow changes in PHI(s,n,d)cur and therefore also in network delays. PHI(s,n,d)cur is then renormalized such that the sum over all neighboring nodes n again equals 1.0 for each destination node d. The updated routing variable is then used to update the measurement of the path delay from node s to node d.

More particularly, the path delay from node s to node d is updated in accordance with a summation of the path delays from node s to the neighboring nodes n and from the neighboring nodes to the destination node d, weighted by their respective updated routing variables in accordance with the expression:

$$DELAY(s,d)cur = \Sigma_n PHI(s,n,d)cur*[NAYDIS(s,n) + DELAY(n,d)] \quad (3)$$

This updated path delay DELAY(s,d)cur is then transmitted to each neighboring node n. Also transmitted, as necessary, is the used vector representative of which nodes of the network are participants in the routing of data packets from node s to destination node d. These updates and vectors are used by the neighboring nodes to update their lists of routing variables. At each node, the updated use vectors are logically combined by ORing the corresponding bits in the vectors for all neighboring nodes n for which the updated value of the associated routing variable PHI(s,n,d) is non-zero. In addition, that bit of the vector which corresponds to node s is set to a "1", since node s (2 in the present example) is, itself, used on the route to destination node 7.

Once node s has updated each routing variable, it may then begin selectively routing packets for transmission from node s to destination node d. For this purpose, a conventional path assignment scheme, such as the use of a random number generator to direct respective packets out over the network, may be employed. Thus, in the present example, as each packet is coupled to output node 2's output buffer, it is assigned to one of the outgoing paths to nodes 3 and 4 in accordance with which of the links to nodes 3 and 4 has an associated routing variable that more closely satisfies a predetermined relationship with the randomly generated number. For example, letting PHI(2,3,7)=0.436 and PHI(2,4,7)=0.564, and the random number generator producing numbers between 0 and 1,000, then whenever the generated number fails between 0 and 436, the packet is routed to node 3, and whenever the generated number falls between 437 and 1,000, the packet is routed to node 4. These current values of PHI(2,3,7) and PHI(2,4,7) are used until the next routing variable update iteration at node 2.

As will be appreciated from the foregoing description, because the routing mechanism of the present invention is distributed among all of the nodes, it enjoys an enhanced ability to route packets between all connected nodes, regardless of which nodes are operational. Centralized routing mechanisms, on the other hand, make certain nodes more critical than others, thereby decreasing network survivability in the event of a catastrophic failure of such a node. The asynchronous execution of the routing mechanism at each node simplifies its implementation since accurate clock synchronization among nodes is not required. Moreover, since each node bases its routing decisions on information that it can measure itself and on information received from nodes with which it shares a direct communication link (i.e. neighboring nodes), a large amount of communication overhead, that might otherwise be required by a global knowledge mechanism in order to broadcast the entire network topology to every node, is eliminated. Finally, the simplicity of both the path delay measurements and the heuristic itself avoid the intensive processing and hardware penalties that are imposed by the use of 'incremental delay' in the above-referenced Gallager scheme. Depending upon the technique used, an estimation of 'incremental delay' may require a much longer observation interval, as well as considerably greater processing power than the present invention's estimate of a simpler metric, path delay, with similar accuracy.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as ar obvious to one of ordinary skill in the art.

What is claimed:

1. A method of controlling the distribution of transmission routes for information signal packets from node s over communication links through other nodes to a destination node d of a multinode communication network comprising the steps of:
    (a) obtaining a measurement of path delay DELAY(s,d) between node s and destination node d;
    (b) obtaining a measurement of path delay DELAY(n,d) between a neighboring node n, through which a packet may be transmitted in the course of its transmission from node s to destination node d, and destination node d;
    (c) obtaining a measurement of the delay estimate NAYDIS(s,n) between node s and neighboring node n;
    (d) generating a routing variable PHI(s,n,d) representative of the percentage of time that a packet is to be transmitted from node s to neighboring node n, in the course of its transmission to destination node d, in accordance with a prescribed relationship among the measurements obtained in steps (a)-(c);
    (e) carrying out steps (a)-(d) for plural neighboring nodes n through which a packet may be transmitted in the course of its transmission from node s to said destination node d, so as to obtain a plurality of routing variables respectively associated with neighboring nodes of node s; and
    (f) selectively routing packets for transmission from node s to destination node d in accordance with the routing variables obtained in step (e).

2. A method according to claim 1, wherein step (d) comprises generating an initial value of a routing variable PHI (s,n,d) in accordance with a prescribed relationship among the measurements obtained in steps (a)-(c) and combining said initial value of said routing variable with a previously generated value of said routing variable to obtain a current value of said routing variable, and wherein step (f) comprises selectively routing packets for transmission from node s to neighboring nodes n in accordance with current values of said routing variables.

3. A method according to claim 2, wherein step (d) includes the steps of:
    (d1) for each node that has no direct communication path to node s, generating an associated routing variable PHI(s,n,d) that is equal to a prescribed value,
    (d2) for each node that is using node s as part of a communication path between said each node and said destination node d, generating an associated routing variable PHI(s,n,d) that is equal to said prescribed value, and
    (d3) for each node that has no established path to said destination node d, generating an associated routing variable PHI(s,n,d) that is equal to said prescribed value, but otherwise generating an associated routing variable PHI(s,n,d) in accordance with the prescribed relationship among the measurements obtained in steps (a)-(c).

4. A method according to claim 3, wherein step (d) further includes the step of:
    (d4) for each node that has an established path, but undefined delay, to said destination node d, setting the initial value of its associated routing variable PHI(s,n,d) to said prescribed value.

5. A method according to claim 4, wherein said prescribed value is zero.

6. A method according to claim 2, wherein step (d) includes generating the current value of a routing variable as the sum of a predefined fraction of the initial value of the routing variable and the product of a previous value of the routing variable and the difference between unity and said predefined fraction.

7. A method according to claim 1, wherein step (a) includes the step of periodically transmitting, from node s to each of its neighboring nodes n, a measurement of path delay DELAY(s,d) from node s to destination node d.

8. A method according to claim 7, wherein step (a) further includes the step of transmitting, from node s to each of its neighboring nodes n, a signal representative of which nodes are currently being used as part of a communication path between node s and destination node d.

9. A method according to claim 8, wherein step (a) includes the step of transmitting, from node, ,s to each of its neighboring nodes n, a vector-representative signal indicative of which nodes in the network are being used as part of a communication path from node s to destination node d.

10. A method according to claim 9, wherein step (a) comprises transmitting said vector representative signal only in response to the occurrence of a change as to which nodes in the network are being used as part of a communication path from node s to destination node d.

11. A method according to claim 1, wherein step (c) comprises obtaining a measurement of delay estimate NAYDIS(s,n) between node s and a neighboring node n as a function of propagation time between node s and neighboring node n and average packet queueing delay at node s on the link to node n.

12. A method according to claim 7 wherein step (a) comprises obtaining a measurement of path delay DELAY(s,d) between node s and destination node d as a function of the sum of measurement of the path delay DELAY(n,d) from node n to destination node d that has been transmitted to node s from neighboring node n and delay estimate NAYDIS(s,n) between said node s and node n.

13. A method according to claim 12, wherein step (a) comprises, at node s, obtaining a measurement of path delay DELAY(s,d) between node s and destination node d as a weighted summation of the product of a plurality of routing variables PHI(s,n,d) and the sum of the measurements of path delay DELAY(n,d) from its neighboring nodes n to destination node d that have been transmitted to node s from neighboring nodes n and delay estimates NAYDIS(s,n) between said node s and neighboring nodes n.

14. A method according to claim 6, wherein step (d) includes generating the initial value of a respective routing variable PHI(s,n,d)$^{init}$ in accordance with the ratio of the difference between a measurement of path delay DELAY(s,d) between node s and destination node d from a previous iteration and a measurement of path delay DELAY(n d) between neighboring node n and destination node d to a quantity based upon the sum of a measurement of path delay DELAY(n,d) between neighboring node n and destination node d and a measurement of delay estimate NAYDIS(s,n) between node s and neighboring node n.

15. A method according to claim 14, wherein said quantity corresponds to the square of the sum of a measurement of path delay DELAY(n,d) between neighboring node n and destination node d and a measurement of delay estimate NAYDIS(s,n) between node s and node n.

16. A method of controlling the distribution of transmission routes for information signal packets from a node s over a plurality of communication links through neighboring nodes n to a destination node d of a multinode communication network comprising the steps of:

(a) generating a set of routing variables PHI(s,n,d), respectively representative of percentages of time that packets to be transmitted from node s to destination node d are transmitted from node s through respective nodes n; and (b) selectively routing packets for transmission from node s to destination node d through nodes n in accordance with the set of routing variables generated in step (a); and wherein step (a) comprises the steps of:

(a1) for each node that has no direct communication path to node s, generating an associated routing variable PHI(s,n,d) that is equal to a prescribed value, (a2) for each node that is using node s as part of a communication path from that node to said destination node d, generating an associated routing variable PHI(s,n,d) that is equal to said prescribed value, (a3) for each node that has no established path to destination node d, generating an associated routing variable PHI(s,n,d) that is equal to said prescribed value, (a4) measuring path delay DELAY(s,d) between node s and destination node d, (a5) measuring path delays DELAY(n,d) between neighboring nodes n and destination node d, (a6) measuring packet propagation and queueing delays NAYDIS(s,n) between node s and neighboring nodes n, and (a7) for each neighboring node that has an available path to destination node d and whose associated routing variable PHI(s,n,d) has not been set to said prescribed value in step (a2), generating an associated routing variable PHI(s,n,d) in accordance with a prescribed relationship among delays measured in steps (a4)–(a6).

17. A method according to claim 16, wherein step (a7) comprises generating an initial value of a routing variable PHI (s,n,d) in accordance with a prescribed relationship among the measurements obtained in steps (a4)–(a6) and combining said initial value of said routing variable with a previously generated value of said routing variable to obtain a current value of said routing variable, and wherein step (b) comprises selectively routing packets for transmission from node s to destination node d through neighboring nodes n in accordance with current values of said routing variables.

18. A method according to claim 17, wherein step (a) further includes the step of:

(a8) for each node that has an established path, but undefined delay, to destination node d, setting the initial value of its associated routing variable PHI(s,n,d) to said prescribed value.

19. A method according to claim 18 wherein said prescribed value is zero.

20. A method according to claim 17, wherein step (a7) includes generating the current value of a routing variable as the sum of a predefined fraction of the initial value of the routing variable and the product of a previous value of the routing variable and the difference between unity and said predefined fraction.

21. A method according to claim 16, wherein step (a4) includes the step of periodically transmitting, from node s to each of its neighboring nodes n, a measurement of path delay DELAY(s,d) from node s to destination node d.

22. A method according to claim 21, wherein step (a4) further includes the step of transmitting, from node s to each of its neighboring nodes n, a signal representative of whether or not the neighboring node to whom the signal is transmitted is being used as part of a communication path between node s and destination node d.

23. A method according to claim 22, wherein step (a4) includes the step of transmitting, from node s to each of its neighboring nodes n, a vector-representative signal indicative of which nodes in the network are being used as part of a communication path from node s to destination node d.

24. A method according to claim 23, wherein step (a4) comprises transmitting said vector representative signal only in response to the occurrence of a change as to which nodes in the network are being used as part of a communication path from node s to destination node d.

25. A method according to claim 21, wherein step (a4) comprises measuring path delay DELAY(s,d) between node s and destination node d as a function of the sum of the path delay DELAY(n,d) from node n to destination node d that has been transmitted to node s from neighboring node n and delay estimate NAYDIS(s,n) between said node s and node n.

26. A method according to claim 25, wherein step (a4) comprises, at node s, measuring path delay DELAY(s,d) between node s and destination node d as a weighted summation of the product of a plurality of routing variables PHI(s,n,d) and the sum of measurements of the path delay DELAY(n,d) from its neighboring nodes n to destination node d that have been transmitted to node s from neighboring nodes n and delay estimate NAYDIS(s,n) between said node s and neighboring nodes n.

27. A method according to claim 20, wherein step (a7) includes generating the initial value of a respective routing variable $PHI(s,n,d)^{init}$ in accordance with the ratio of the difference between a measurement of path delay DELAY(s,d) between node s and destination node d from a previous iteration and a measurement of path delay DELAY(n,d) between neighboring node n and destination node d to a quantity based upon the sum of a measurement of path delay DELAY(n,d) between neighboring node n and destination node d and a measurement of delay estimate NAYDIS(s,n) between node s and neighboring node n.

28. A method according to claim 27, wherein said quantity corresponds to the square of the sum of a measurement of path delay DELAY(n,d) between neighboring node n and destination node d and a measurement of delay estimate NAYDIS(s,n) between node s and node n.

29. A method of generating respective routing variables for controlling the distributed flow of information signals from a node s over a multinode communication network to a destination node d comprising performing, at node s of the network, the steps of:

(a) for any node of the network that either is not a directly connected neighbor to node s, has not established a connection path to a destination node d, or is using node s as part of its communication path to destination node d, generating an associated routing variable having a prescribed value which represents that said any node is not to be used to route information signals from node s to node d;

(b) measuring path delays from node s to neighboring nodes n;

(c) obtaining a measurement of path delay from node s to destination node d;

(d) obtaining measurements of path delays from neighboring nodes n to destination node d; and (e) for each neighboring node, an associated routing variable for which was not generated in step (a), generating a respective routing variable associated with that neighboring node n in accordance with a prescribed relationship among path delays of steps (b)–(d).

30. A method according to claim 29, further including the step of:

(f) periodically transmitting, to each neighboring node n, a path delay from node s to destination node d, a measurement for which was obtained in step (c).

31. A method according to claim 30, further including the steps of:

(g) transmitting, to each neighboring node n, a signal representative of whether or not node s is using that neighboring node n to route information signals from node s to destination node d.

32. A method according to claim 31, wherein step (g) comprises transmitting, to each neighboring node n, a digital code representative of which nodes of the network are participants in the routing of information signals from node s to destination node d.

33. A method according to claim 29, wherein step (e) comprises the steps of:

(e1) generating a respective preliminary routing variable in accordance with a prescribed relationship among path delays of steps (b)–(d), and (e2) generating a respective updated routing variable in accordance with a predefined relationship between said preliminary routing variable and a previously generated routing variable.

34. A method according to claim 33, wherein step (c) comprises obtaining a measurement of path delay from node s to node d in accordance with a summation of path delays of step (b) and step (d) weighted by the respective updated routing variables generated in step (e2).

35. A method according to claim 33, wherein step (e1) comprises setting the value of said preliminary routing variable at said prescribed value in step (a), in response to the value of path delay of neighbor node n that has established a connection path to said destination node, exceeding a predetermined path delay value.

36. A method according to claim 35, wherein said prescribed value of said associated routing variable is zero.

37. A method according to claim 33, wherein step (e1) comprises generating said preliminary routing variable $PHI(s,n,d)^{init}$ in accordance with the ratio of the difference between a measurement of path delay between node s and destination node d from a previous iteration and a measurement of path delay between neighboring node n and destination node d to a quantity based upon the sum of a measurement of path delay between neighboring node n and destination node d and a measurement of delay estimate between node s and neighboring node n.

38. In a multinode communications network having a plurality of communication nodes, each of which is capable of transmitting information signals to and receiving communication signals from other nodes of the network, so that a plurality of transmission routes from a source node s to a destination node d may be established among plural nodes of the network, an arrangement, provided at said source node, for controlling the distributed flow of information signals from said node s to said destination node d comprising:

means for monitoring the network connectivity of the respective nodes of the network and, for any node of the network that either is not directly connected neighbor to node s, has not established a connection path to a destination node d, or is using node s as part of its communication path to destination node d, generating an associated routing variable having a prescribed value which represents that said any node is not to be used to route information signals from node s to node d, said monitoring means including means for measuring path delays from node s to neighboring nodes n, obtaining a measurement of path delay from node s to destination node d, and obtaining measurements of path delays from neighboring nodes n to destination node d and, for each neighboring node, an associated routing variable for which has not been generated at said prescribed value, generating a respective routing variable associated with that neighboring node n in accordance with a prescribed relationship among path delay measurements; and means for selectively routing information signals from node s to neighboring node d in accordance with said respective routing variables.

39. An arrangement according to claim 38, wherein each node further comprises means for periodically transmitting, to each neighboring node n, a signal representative of the measurement of path delay from node s to destination node d.

40. An arrangement according to claim 39, wherein said transmitting means includes means for transmitting, to each neighboring node n, a signal representative of whether or not node s is using that neighboring node n to route information signals from node s to destination node d.

41. An arrangement according to claim 40, wherein said transmitting means comprises means for transmitting, to each neighboring node n, a digital code representative of which nodes of the network are participants in the routing of information signals from node s to destination node d.

42. An arrangement according to claim 38, wherein said connectivity monitoring means comprises means for generating a respective preliminary routing variable in accordance with a prescribed relationship among path delay measurements, and generating a respective updated routing variable in accordance with a predefined relationship between said preliminary routing variable and a previously generated routing variable.

43. An arrangement according to claim 42, wherein said connectivity monitoring means comprises means for obtaining a measurement of the path delay from node s to node d in accordance with a summation of measured path delays weighted by the respective updated routing variables.

44. An arrangement according to claim 42, wherein connectivity monitoring means comprises means for setting the value of said preliminary routing variable at said prescribed value in response to the value of path delay of said neighbor node that has established a connection path to said destination node, exceeding a predetermined path delay value.

45. An arrangement according to claim 44, wherein said prescribed value of said associated routing variable is zero.

46. An arrangement according to claim 42, wherein said connectivity monitoring means comprises means for generating said preliminary routing variable in accordance with the ratio of the difference between a measurement of path delay between node s and destination node d from a previous iteration and a measurement of path delay between neighboring node n and destination node d to a quantity based upon sum of a measurement of the path delay between neighboring node n and destination node d and a measurement of delay estimate between node s and neighboring node n.

* * * * *